United States Patent
Iino

(10) Patent No.: US 6,918,555 B2
(45) Date of Patent: Jul. 19, 2005

(54) CARTRIDGE

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 7 days.

(21) Appl. No.: 10/458,367

(22) Filed: Jun. 11, 2003

(65) Prior Publication Data

US 2003/0226926 A1 Dec. 11, 2003

(30) Foreign Application Priority Data

Jun. 11, 2002 (JP) .................................... 2002-169682

(51) Int. Cl.$^7$ ............................................. G11B 23/07
(52) U.S. Cl. ................................. 242/344; 360/132
(58) Field of Search ......................... 242/344, 347, 242/348, 348.2, 357; 360/60, 132, 133; 369/291

(56) References Cited

U.S. PATENT DOCUMENTS

| | | | | |
|---|---|---|---|---|
| 4,041,537 A | * | 8/1977 | Kishi | ........................... 360/132 |
| 4,734,812 A | | 3/1988 | Tanaka et al. | |
| 5,335,875 A | * | 8/1994 | Watanabe et al. | ........... 242/347 |
| 5,418,672 A | * | 5/1995 | Tischler | ....................... 360/132 |
| 5,636,094 A | * | 6/1997 | Schoettle et al. | ........... 360/132 |
| 6,452,746 B1 | * | 9/2002 | Sasaki et al. | ................ 360/132 |
| 6,466,405 B1 | * | 10/2002 | Rambosek | .................... 360/132 |
| 6,477,010 B1 | * | 11/2002 | Johnson et al. | .............. 360/132 |
| 6,490,132 B1 | * | 12/2002 | Kano et al. | ................... 360/132 |
| 6,583,955 B2 | * | 6/2003 | Kano et al. | ................... 360/132 |
| 6,661,609 B1 | * | 12/2003 | Tsuyuki et al. | .............. 360/132 |
| 6,672,527 B2 | * | 1/2004 | Tsuyuki et al. | .............. 242/344 |
| 6,695,241 B2 | * | 2/2004 | Iino | ............................. 242/348 |

* cited by examiner

Primary Examiner—William A. Rivera
(74) Attorney, Agent, or Firm—Sughrue Mion, PLLC

(57) ABSTRACT

A recording tape cartridge. An operation protrusion of an inadvertent erasure prevention plug is inserted into an operation hole, which is formed in a lower case, and exposed to the outside. The operation protrusion is operated in a first direction or a second direction, and thus permission for recording to a recording medium which is accommodated in the case is switched by movement of the inadvertent erasure prevention plug in the first direction or the second direction within the case. At edge portions of the operation hole toward the first direction and the second direction, recess portions communicate with the respective edge portions. Floors of the recess portions are defined by thin-wall straight portions at which an outer face of an angled rear wall of the case is recessed in parallel with an inner face thereof.

18 Claims, 12 Drawing Sheets

CARTRIDGE

BACKGROUND OF THE INVENTION

1. Field of the Invention

The present invention relates to a cartridge which accommodates a recording medium in a case and is provided with a write-protect function which switches between a state in which recording to the recording medium is enabled and a state in which recording is disabled.

2. Description of the Related Art

Cartridges which accommodate recording media in cases are used as external recording media for computers and the like. Specifically, these cartridges may have a structure in which a recording medium is rotatably accommodated in a case which is formed to be hollow by matching peripheral walls of an upper case and a lower case together with one another. The recording medium may be a recording tape wound on a reel, or a disc-form disc medium.

Such a cartridge may be provided with a write-protect portion for preventing mistaken erasure of data that has been recorded to the recording medium. The write-protect portion may have a known structure which includes, for example, an operation hole, a through-hole and a switching member. The operation hole penetrates through a rear wall, which is at a side of the case which is opposite to a side thereof from which the case is loaded at a drive device. The through-hole is provided penetrating through a floor plate of the lower case. Consequent to operation of an operation member, which is exposed through the operation hole, from outside the case, the switching member moves along the floor plate and opens or closes the through-hole. When the through-hole is a long hole, the switching member opens or closes one end portion of this long hole.

That is, with the write-protect portion, a state in which recording to the recording medium by a drive device is disabled, for example, a state in which the switching member closes off the through-hole, can be attained and a state in which recording to the recording medium by a drive device is enabled, such as a state in which the switching member opens up the through-hole, can be attained. Thus, it is possible to switch (a recording permission) alternatively between this recording disabled state and recording enabled state. Switching of this recording permission for the recording medium is implemented by operating the operation portion from outside the case as described above and moving the switching portion to a recording disabled position (for example, a closed position) or a recording enabled position.

A relationship between this switching member (operation portion) and through-hole (case) will be described with reference to FIG. 12. As is shown in FIG. 12, an operation portion 104 is protrudingly provided at a switching member 102, which is disposed to be slidable against an inner face 100A of a rear wall 100 of the case. The operation portion 104 penetrates through the rear wall 100 and is exposed through a through-hole 106. A distal end portion of the operation portion 104 is set so as not to protrude beyond an outer face 100B of the rear wall 100, such that the operation portion 104 is not inadvertently caught on and the recording permission is not inadvertently switched.

Taper surfaces 106A and 106B, which are inclined such that an opening width of the through-hole 106 broadens at the outer face 100B side thereof, are formed at two edge portions of the through-hole 106 in a direction of movement of the switching member 102 (the direction of the arrow shown in FIG. 12). Accordingly, the operation portion 104 can be operated from gaps C which are formed between the operation portion 104, whose distal end does not protrude beyond the rear wall 100, and the taper surfaces 106A and 106B.

However, in a cartridge that is provided with a conventional write-protect portion as described above because the gaps C formed between the operation portion 104 and the taper surface 106A are small, the operation portion 104 must be operated with a small thing such as a user's fingernail or a pen tip. Accordingly, an improvement in operability when the recording judgment is to be switched has been called for.

As a measure therefor, setting through-hole 106 side end portions of the taper surface 106A and the like to the inner face 100A side and widening the gaps C has been considered. However, if a sufficient gap C is to be attained within a limited range of thickness of the case, distal ends at edge portions of the through-hole 106 become sharp, and sharp edges are formed. These sharp edges are a cause of formation failures, or a deterioration in strength when dropped. Accordingly, further measures have been called for.

SUMMARY OF THE INVENTION

In consideration of the circumstances described above, one object of the present invention is to provide a cartridge which improves operability of an operation portion of a switching member, without forming sharp edges at edge portions of an operation hole which exposes the operation portion.

A cartridge related to the present invention, for achieving the object described above, includes a case which accommodates a recording medium thereinside. In addition, the following members are provided. A switching member is movably disposed in the case. This switching member is capable, by moving, of alternatively switching between a recording disabled state in which recording of information to the recording medium is disabled and a recording enabled state which cancels the recording disabled state. An operation portion protrudes at the switching member and is operated when the switching member is to be moved. A portion at which an operation hole is formed is provided to penetrate through the case. The operation portion is inserted into this hole and can be exposed to an exterior. A thin-wall portion is a portion which is formed by recessing an outer face side of the case at an edge portion of the hole substantially in parallel with an inner face side of the case.

In the cartridge of the present invention, the operation portion, which is exposed through the operation hole of the case, is operated and the switching member is moved. Thus, the cartridge (recording permission) is alternatively switched between the recording disabled state and the recording enabled state.

Herein, the thin-wall portion (specifically, a recess portion or a portion which is cut away in a case thickness direction, which serves as a floor portion of the thin-wall portion), at which the outer face side of the case is recessed to be parallel with the inner face side, is formed at the edge portion of the operation hole into which the operation member of the switching member is inserted. Consequently, the operation portion can be operated via the thin-wall portion with ease.

That is, because the thin-wall portion is provided, a space at which the operation portion is exposed (for accessing the operation portion) can be set to be larger, for example, to be a space into which an operator's fingertip or the like can easily be inserted for operating the operation portion. In particular, this thin-wall portion may be structured so as to be provided at edge portions of the operation hole in a movement direction of the switching member (the operation portion), and a space at which the operation portion is exposed to an outer side in the movement direction (a side of the operation portion which is opposite to a side thereof that faces in a direction in which the operation portion is to be moved) is broadened. Consequently, the operation portion can be operated reliably and with greater ease.

Further, because the thin-wall portion at which the outer face and inner face are substantially parallel is substantially level, sharp edges of the case are not formed at the edge portions of the operation hole.

Thus, with such a cartridge of the present invention, operability of the operation portion can be improved without forming sharp edges at the edge portions of the operation hole which exposes the operation portion of the switching member.

At a cartridge with the structure described above, the case may be structured with a thickness at the thin-wall portion being half a thickness (plate thickness) of portions surrounding the thin-wall portion. In such a structure, for a case at which a usual plate thickness is 1 mm to 2 mm, both the aforementioned operability of portions of the case surrounding the operation hole and strength thereof when the case is dropped can be maintained.

DETAILED DESCRIPTION OF THE INVENTION

A recording tape cartridge 10 according to an embodiment of the present invention will now be described on the basis of FIGS. 1 through 11. A schematic overall structure of the recording tape cartridge 10 is described first. An opening and a door, which serves as a shielding member for opening and closing the opening, are described next. A write-protection portion 60, which is an element of the present invention, is then described. For convenience of explanation, a direction in which the recording tape cartridge 10 is mounted in a drive indicated by arrow A is referred to as a forward direction or a front side of the recording tape cartridge 10, and a direction perpendicular to arrow A, i.e., a direction of arrow B is referred to as a rightward direction and a direction of arrow C is referred to as a leftward direction.

Overall Structure of Recording Tape Cartridge

Figure 1:
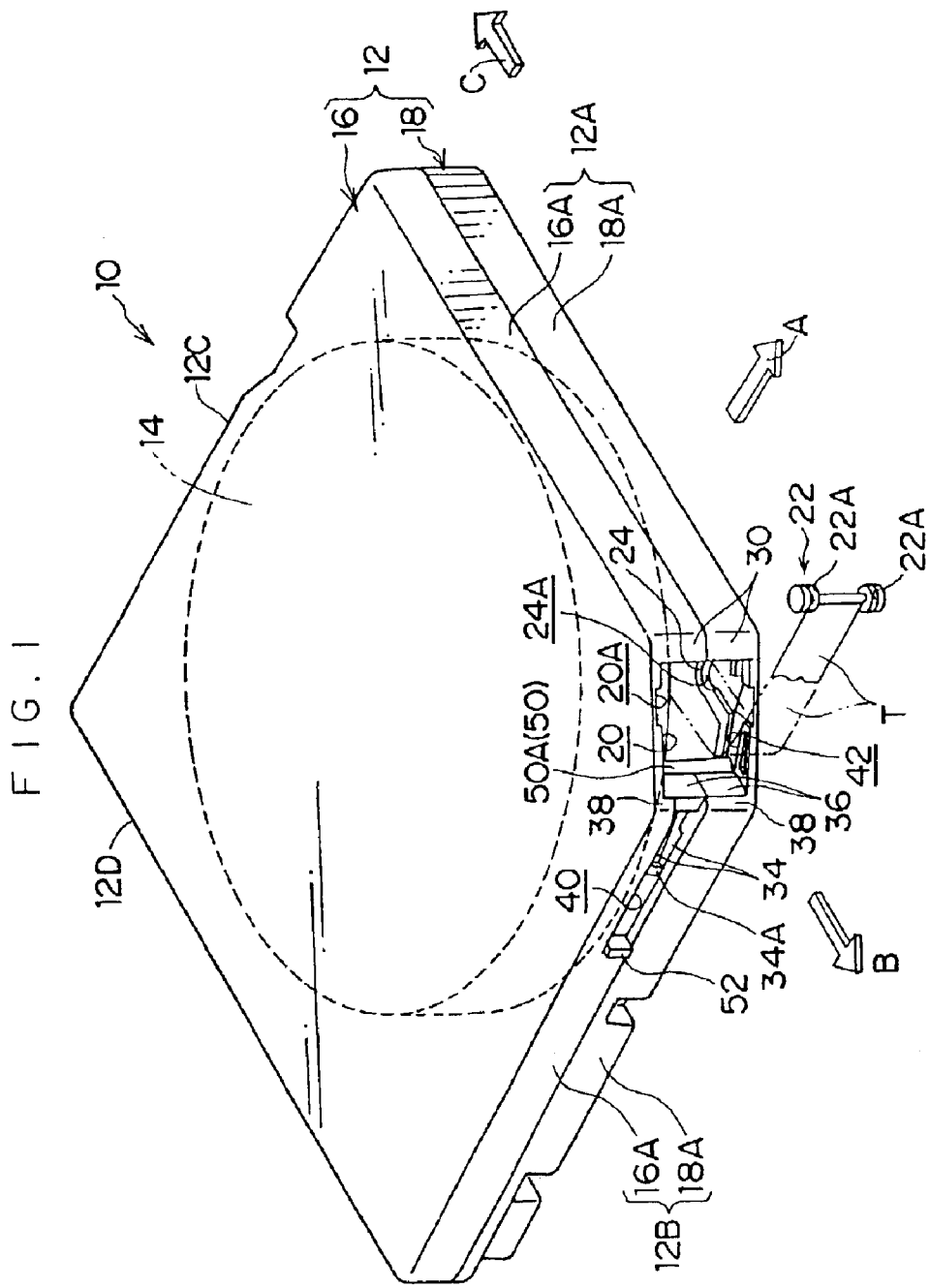
FIG. 1 is a perspective view showing the overall structure of a recording tape cartridge relating to an embodiment of the present invention.
Figure 2:
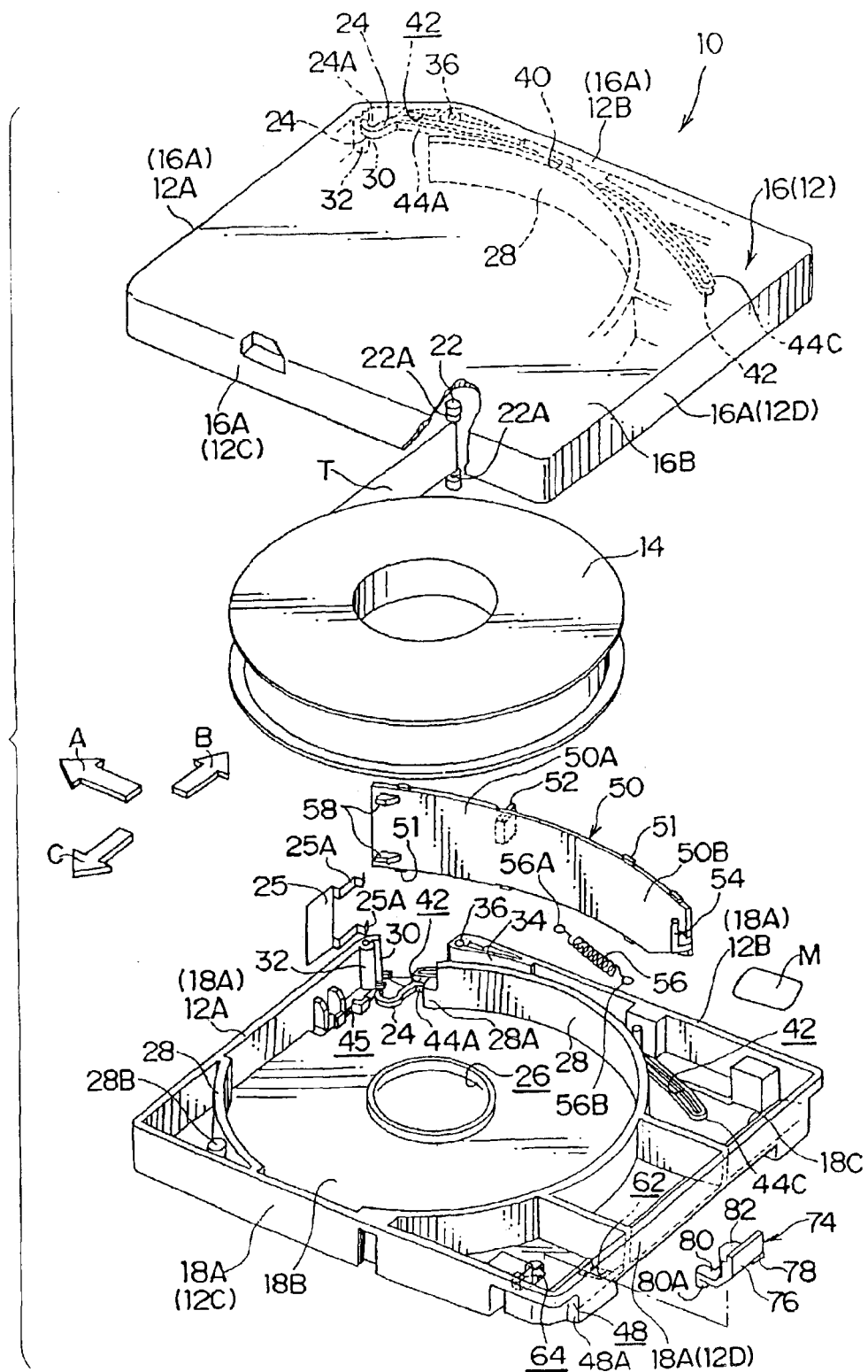
FIG. 2 is an exploded perspective view of the recording tape cartridge relating to the embodiment of the present invention.

FIG. 1 schematically shows the overall structure of the recording tape cartridge 10 in an exploded perspective view. FIG. 2 is generally an exploded perspective view of the recording tape cartridge 10.

The case 12 rotatably accommodates a single reel 14. A magnetic tape T, which is an information recording/reproducing medium or a recording tape, is wound around the single reel 14.

The case 12 is structured with an upper case 16 and a lower case 18, each of which is provided with a notch at one of corner portions thereof, being joined together. The corner portion is located at a side which comes first when the cartridge 10 is mounted in the drive, and may be regarded as a portion formed by cutting the peripheral wall 16A of the upper case 16 and the peripheral wall 18A of the lower case 18. The case 12 has a space therein for accommodating the reel 14, around which the magnetic tape T is wound. The corner portion serves as an opening 20, through which the magnetic tape T is drawn out. The opening 20 and a door 50 for opening and closing the opening 20 will be described later.

A leader pin 22 is connected to a free end of the magnetic tape T drawn out through the opening 20. The leader pin 22 is anchored at or engaged with a drawing device of the drive to be drawn out. An annular groove 22A is formed at each of ends of the leader pin 22 projecting beyond width-directional ends of the magnetic tape T. The annular grooves 22A are anchored, for example, at hooks of the drawing device. Thus, the hooks do not contact and damage the magnetic tape T when the magnetic tape T is drawn out.

A pair of upper and lower pin seats 24 for positioning and holding the leader pin 22 in the case 12 are disposed at the case 12 inside and in the vicinity of the opening 20. The pin stands 24 are formed in semi-cylindrical shapes which open in the direction of arrow B. Both end portions of the leader pin 22, which is in a state of standing upright, are held in concave portions 24A of the pin stands 24. The pin stands 24 are continuous with ribs 44. The ribs 44 will be described later.

A plate spring 25 is fixed in the vicinity of the pin stands 24. The plate spring 25 engages with the upper and lower end portions of the leader pin 22, and holds the leader pin 22 at the pin stands 24. When the leader pin 22 enters into and exits out from the pin stands 24, arm portions 25A of the plate spring 25 are appropriately and elastically deformed, such that movement of the leader pin 22 is permitted.

A gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by movement restricting walls 28 which partially project out at the inner surfaces of the upper case 16 and the lower case 18, and which serve as inner walls which are on a circular locus which is coaxial with the gear opening 26.

An enclosure 28A, in which a hole for position regulation is formed, is continuous with the end portion of the movement restricting wall 28 in a vicinity of the opening 20. An enclosure 28B, in which is formed a hole for position regulation which is a long hole, stands erect in the space sandwiched between the front left corner portion of the case 12 and the movement restricting wall 28. The enclosures 28A, 28B are disposed on a single straight line which extends along the direction of arrow B. End portions of the movement restricting walls 28, except for the end portion thereof at which the enclosure 28A is continuous, are continuous with the peripheral wall 16A or the peripheral wall 18A of the case 12, so as to partition the outer sides of the movement restricting walls 28 and the space at which the reel 14 is set.

A memory board M, which stores various types of information in accordance with each type of the recording tape 10, is set at the rear right portion of the lower case 18. A portion of a rear wall 18C forming the peripheral wall 18A is inclined at a predetermined angle and the memory board M is disposed so as to be inclined at a predetermined angle, such that sensing is possible at a drive device which reads from the bottom surface side and at a library device which reads from the rear surface side.

Opening, and Structure of Case in Vicinity of Opening

Figure 3:
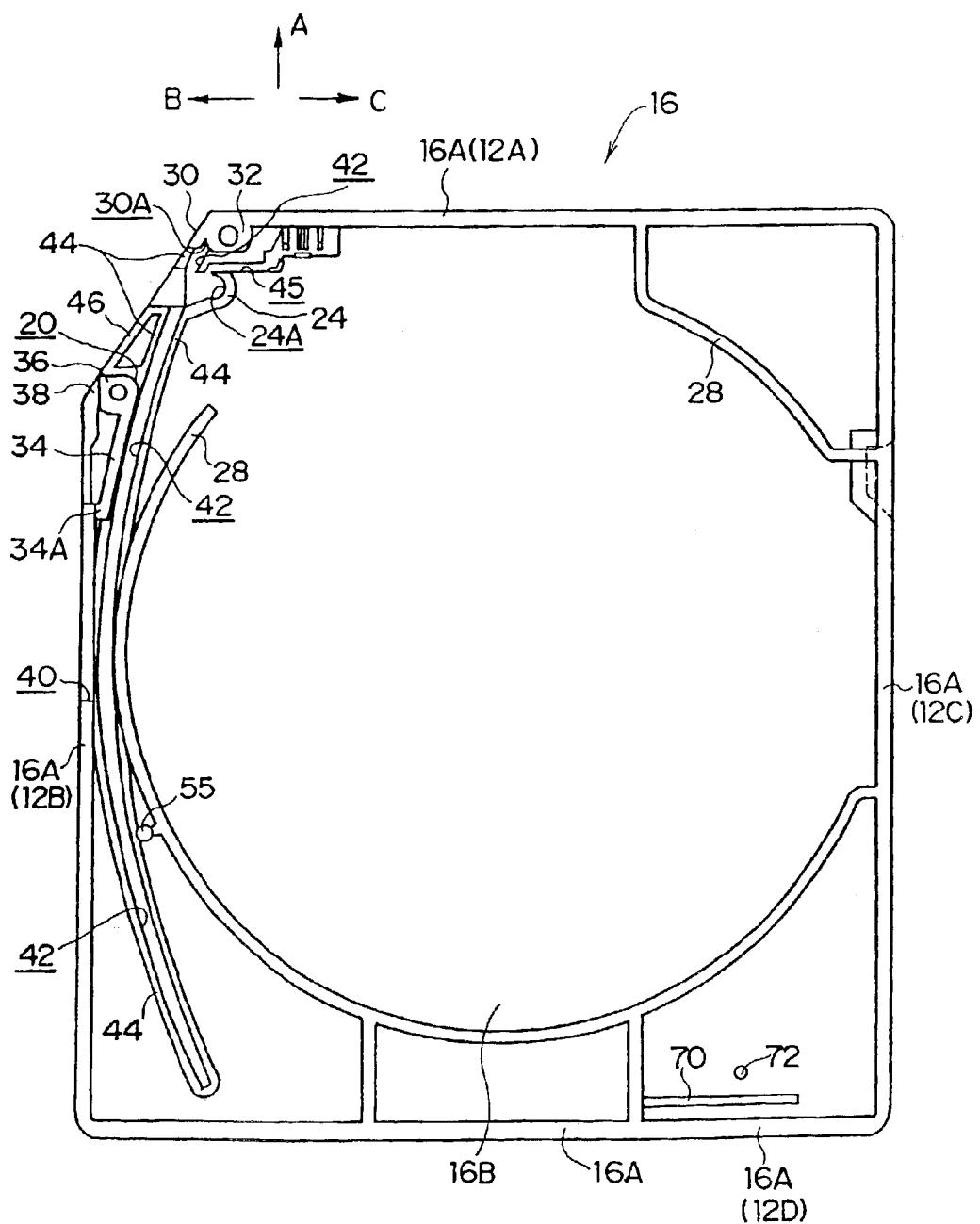
FIG. 3 is a bottom view of an upper case forming the recording tape cartridge relating to the embodiment of the present invention.
Figure 4:
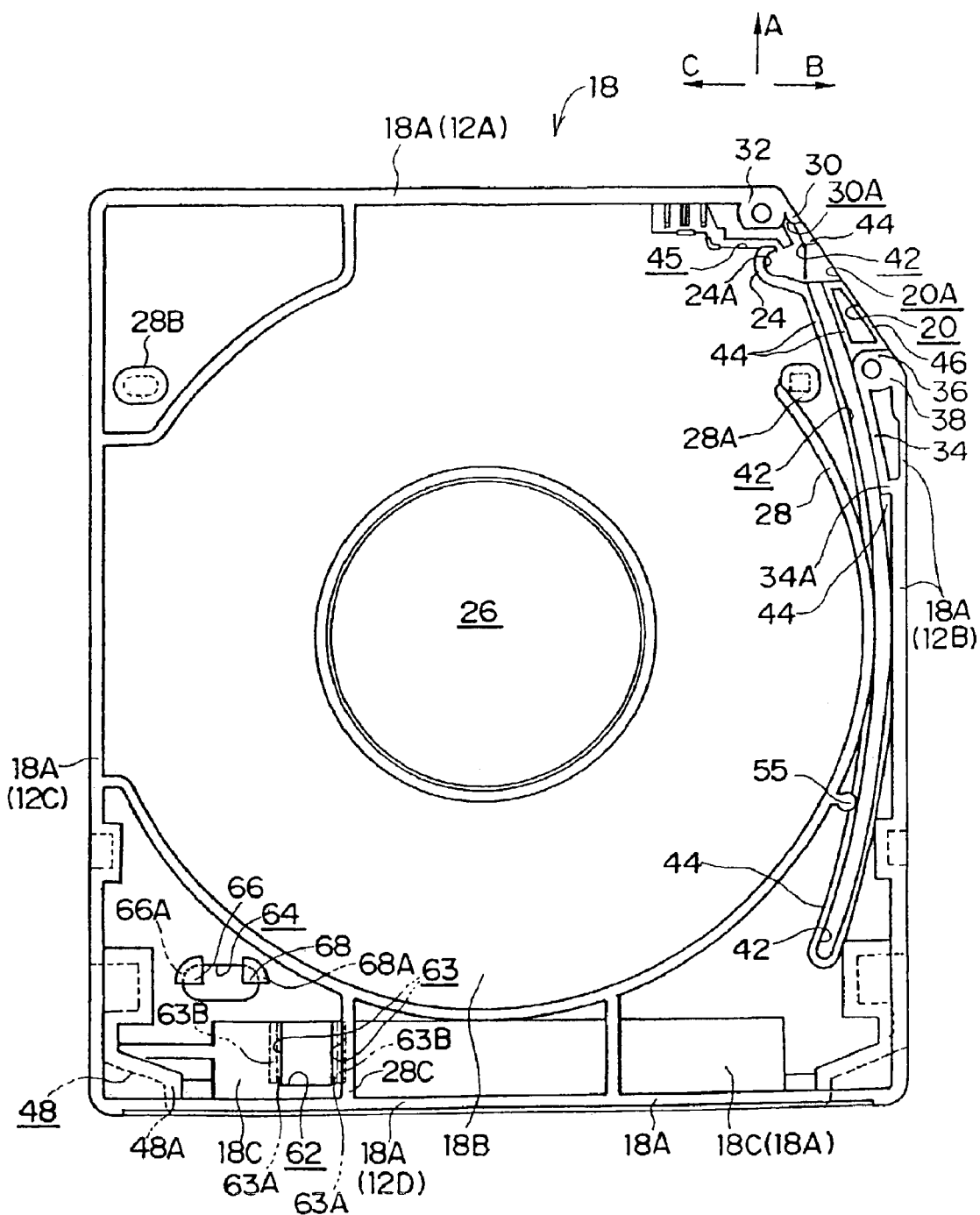
FIG. 4 is a plan view of a lower case forming the recording tape cartridge relating to the embodiment of the present invention.

As shown in FIG. 3 and FIG. 4, a pair of upper and lower screw bosses 32 and a pair of upper and lower screw bosses 36 are provided at the front and rear edge portions of the opening 20, respectively. The screw bosses 32, 36, as well as other screw bosses which are not illustrated, are the devices which connect the upper case 16 and the lower case 18.

The screw bosses 32 are positioned at the front edge portion of the opening 20. The screw bosses 32 are continuous with the right end portion of a front wall 12A of the case 12. The front wall 12A is the portions of the peripheral walls 16A, 18A whose outer surfaces are directed in the direction of arrow A. The screw bosses 32 are continuous with a pair of upper and lower dust-proofing walls 30. The dust-proofing walls 30 are short and are bent along the plane of opening of the opening 20 from the right end portion of the front wall 12A. Concave portions 30A, into which the distal end portion of a door 50 enters, are formed between the screw bosses 32 and the dust-proofing walls 30. The door 50 will be described later.

The screw bosses 36, which are positioned at the rear edge portion of the opening 20, are continuous with bent walls 38 and with a pair of upper and lower arc-shaped walls 34. The bent walls 38 are formed such that the front end portion of a right wall 12B of the case 12 is bent substantially along the plane of opening of the opening 20. The right wall 12B is the right side walls of the peripheral walls 16A, 18A which run along the direction of arrow A. The arc-shaped walls 34 are provided at the inner side of the right wall 12B. The upper and lower arc-shaped walls 34 are formed in an arc-shape which, in plan view, substantially corresponds to (the locus of movement of) the outer peripheral surface of the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

A slit 40 is formed in the right wall 12B of the case 12. The slit 40 is of a certain length and serves as a window portion to communicate the interior and the exterior of the case 12. The slit 40 is also for exposing an operation projection 52 of the door 50. The slit 40 is formed by cutting out the lower portion of the peripheral wall 16A which forms the right wall 12B. The slit 40 opens toward the front as well by also cutting out the lower portion of the bent wall 38 of the upper case 16.

A guide groove 42 which guides the door 50 is provided in each of the upper case 16 and the lower case 18 forming the case 12. The groove walls of the guide grooves 42 are structured by the ribs 44 standing erect at a ceiling plate 16B of the upper case 16 or a bottom plate 18B of the lower case 18, the right wall 12B (either the peripheral wall 16A or the peripheral wall 18A), and the movement restricting walls 28. The guide grooves 42 are formed without making the ceiling plate 16B or the bottom plate 18B thinner. The ribs 44 are provided to be continuous with the pin stands 24.

Each guide groove 42 is formed in an arc-shape which runs along a circumference whose proximal end is the concave portion 30A and which reaches the right rear corner portion of the case 12. This circumference is determined so as to pass (thread its way through) at the outer side of the screw bosses 32, the inner side of the screw bosses 36, and between the right wall 12B and the movement restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the movement restricting walls 28).

A portion which is located at the opening 20 of the guide channel 42 at the right side of the pin stand 24 is cut away, communicates with the recess portion 24A, and communicates with a spring channel 45 at which the arm portion 25A of the plate spring 25 is disposed. In addition, at the cutaway portion of the guide channel 42, a tapering opening 20A at which the leader pin 22 passes into the case 12 communicates with the recess portion 24A of the pin stand 24. Further still, a rib 46, which is formed along, respectively, a rear edge of the tapering opening 20A, a front edge of the screw boss 36 and the opening face of the opening 20, is continuous with the rib 44. Thus, the strength of surroundings of the opening 20 of the case 12 is assured or improved.

At a rear end of a rib 44C, which forms the rear half portion of each guide groove 42, the rib 44C bends back in a substantial U shape. The rib 44C of the upper case 16 is formed to be longer than the rib 44C of the lower case 18. This is in order for the rib 44C to not interfere with the memory board M and the door 50, because the rear wall 18C (peripheral wall 18A) of the lower case 18, at which the memory board M is disposed at the right wall 12B side, is formed as an inclined surface.

A pair of top and bottom spring catching pins 55 are provided at the longitudinally central portion of the inner side portion of the rib 44C. The spring catching pins 55 are continuous with the movement restricting walls 28. The spring catching pin 55 at the upper case 18 side is formed to be longer. One end side annular portion 56A of a coil spring 56 which will be described later catches on the portion of this spring catching pin 55 which projects higher than the movement restricting wall 28. The coil spring 56 is prevented from falling out due to the short spring catching pin 55 at the upper case 16 side abutting the spring catching pin 55 at the lower case 18 side.

The case 12 is formed by the upper case 16 and lower case 18 being joined and fixed together by unillustrated screws being screwed into the screw bosses 32, 36 and other screw bosses from beneath, in a state in which the peripheral walls 16A, 18A of the upper case 16 and the lower case 18 oppose one another. A right-front corner of the case 12 is cut to form the opening 20, and opens toward the directions of arrow A and B. A pull-out means of the drive can approach to the leader pin 22 from a range made of the directions of the arrows A and B, and engage the pin 22. The area where the pin stands 24 are set and the area where the pull-out means of the drive can engage the leader pin 22 become large. As a result a position of the pin stand 24 is set in accordance only with the specification of the drive approaching to engage, and freedom in designing the drive is obtained.

Structure of Door

The above-described opening 20 is opened and closed by the door 50 which serves as a closing member. The door 50 is formed in an arc-shape which curves along the direction of plate thickness thereof, and whose curvature as seen in plan view coincides with the curvature of the guide grooves 42 or a certain circumference. The portion of the door 50 at the front portion thereof, or at least the portion thereof which closes the opening 20, where the plate width or height is formed to be substantially equal to the opening height of the opening 20, is a closing portion 50A. The portion of the door 50 which is at the rear side of the closing portion 50A and whose plate width is slightly smaller than that of the closing portion 50A, is a driving portion 50B.

Figure 5A:
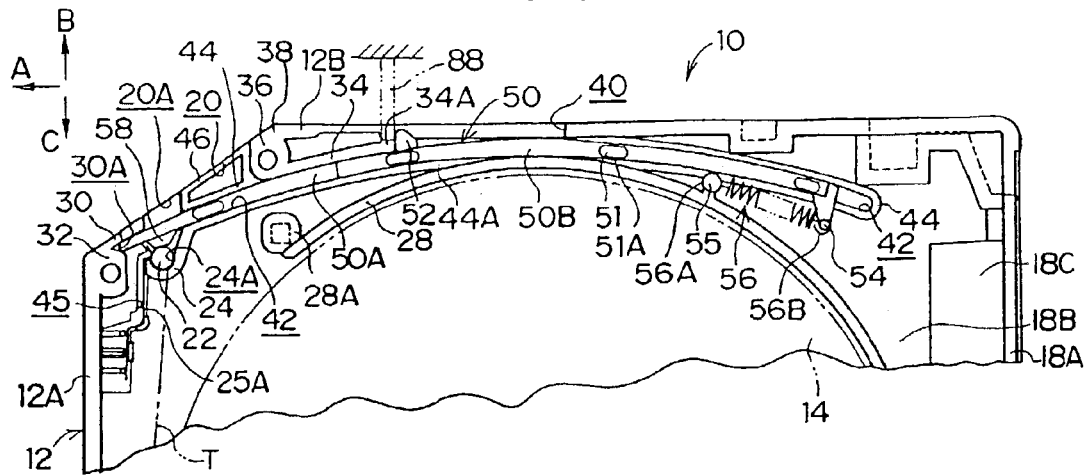
FIG. 5A is a view, as seen with the upper case removed, of a process of opening the opening of the recording tape cartridge relating to the embodiment of the present invention, and is a plan view showing an initial engaged state of an engagement projection of a drive device with an operation projection of the door.

The plate length of the door 50 or the curved longitudinal dimension thereof is determined such that, in the state in which the door 50 closes the opening 20, the rear end portion of the driving portion 50B is positioned in the right rear corner portion of the case 12 (see FIG. 5A). Note that the bottom rear portion of the driving portion 50B is cut obliquely in order to avoid the memory board M which is disposed obliquely at the rear wall 18C.

The door 50 closes the opening 20 (see FIG. 5A) in a state in which the distal end portion of the closing portion 50A enters into the concave portions 30A, which are positioned at the outer sides of the screw bosses 32. The door 50 moves (rotates) substantially rearward along the guide grooves 42 so as to open the opening 20 (see FIG. 5B). When the outer peripheral surface of the distal end of the closing portion 50A reaches the inner sides of the screw bosses 36, the opening 20 is completely opened (see FIG. 5C). When the door 50 closes the opening 20, the door 50 rotates in the direction substantially opposite to the direction at the time of opening the opening 20.

In this way, the door 50 is curved so as to open and close the opening 20 by rotating without jutting out from the circumference which is the locus of movement of the door 50. It suffices for the center of rotation and the radius of the door 50 (the configuration of the guide grooves 42) to be appropriately determined in accordance with the angle of the plane of opening of the opening 20, which is determined by the requirements of the library device, or in accordance with the positions of the front and rear edge portions of the opening 20 (the screw bosses 32, 36) which are determined by the requirements of the drive device.

A plurality of convex portions 51, which enter into the upper and lower guide grooves 42, project at the upper and lower ends of the door 50. The projecting heights of the convex portions 51 differ at the closing portion 50A and the driving portion 50B. However, the distance from the central line in the widthwise direction of the door 50 (the central line along the longitudinal direction of the door 50) to the peak portion of each convex portion 51 is constant. In this way, the top and bottom convex portions 51 slide along the ceiling plate 16B or the bottom plate 18B which are the bottom portions of the guide grooves 42.

Projections 51A, whose peak portions run along the end surfaces in the direction of the plate thickness of the door 50, project at the both sides, in the direction of plate thickness of the door 50, of each convex portion 51. The projections 51A slide along the groove walls (the ribs 44 and the like) of the guide grooves 42. Note that the convex portion 51 which is positioned furthest toward the front is disposed such that, when the opening 20 is being opened or closed, it does not enter into the taper opening 20A which is continuous with the guide groove 42.

When the door 50 is opening and closing the opening 20, the door 50 is guided in the guide grooves 42 by the convex portions 51 and the projections 51A, and does not jut out from the locus of movement. The door 50 twists its way through at the outer sides of the screw bosses 32 and the inner sides of the screw bosses 36 and between the right wall 12B and the movement restricting walls 28, and reliably opens the opening 20.

The operation projection 52, which serves as an operation portion, projects along the radial direction of the door 50 at the outer peripheral portion, in a vicinity of the front end (the closing portion 50A side) of the driving portion 50B of the door 50. The operation projection 52 is exposed to the exterior of the case 12 from the slit 40. The operation projection 52 moves the door 50 to open by engaging an engaging projection 88. The engaging projection 88 enters the slit 40 in accordance with attaching of the cartridge 10 to the drive or relative movement.

The substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging means. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50.

In this way, the door 50 is urged in the direction of closing the opening 20 by the urging force of the coil spring 56, and usually closes the opening 20. The coil spring 56 has a length which reaches the rear right corner portion of the case 12 in the state in which the door 50 closes the opening 20 as described above. Therefore, the space between the movement restricting walls 28 and the peripheral walls 16A, 18A (the rear wall 18C) at this rear right corner potion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop.

Figure 5B:
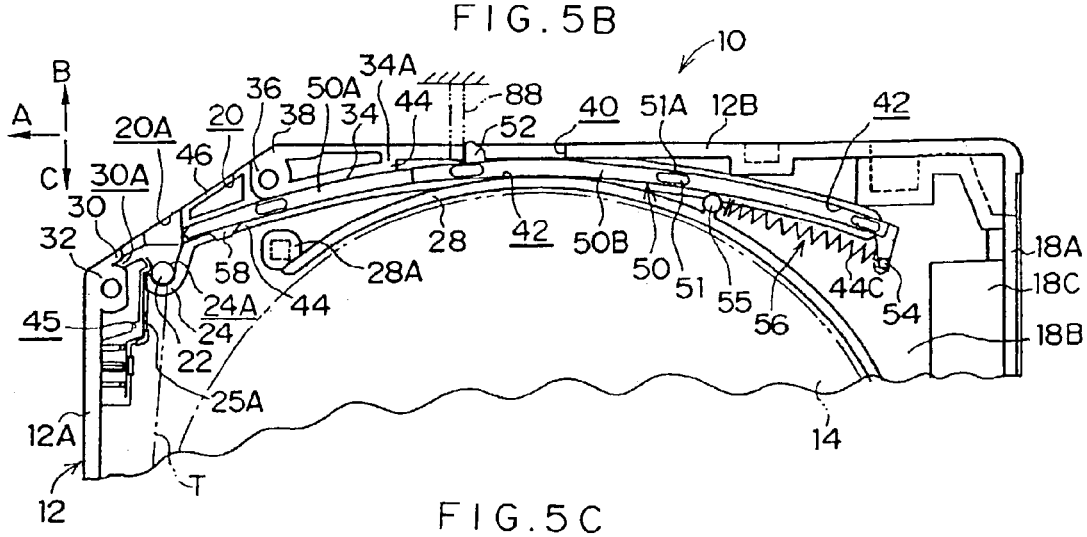
FIG. 5B is a view, as seen with the upper case removed, of the process of opening the opening of the recording tape cartridge relating to the embodiment of the present invention, and is a plan view showing a state during the opening of the opening.
Figure 5C:
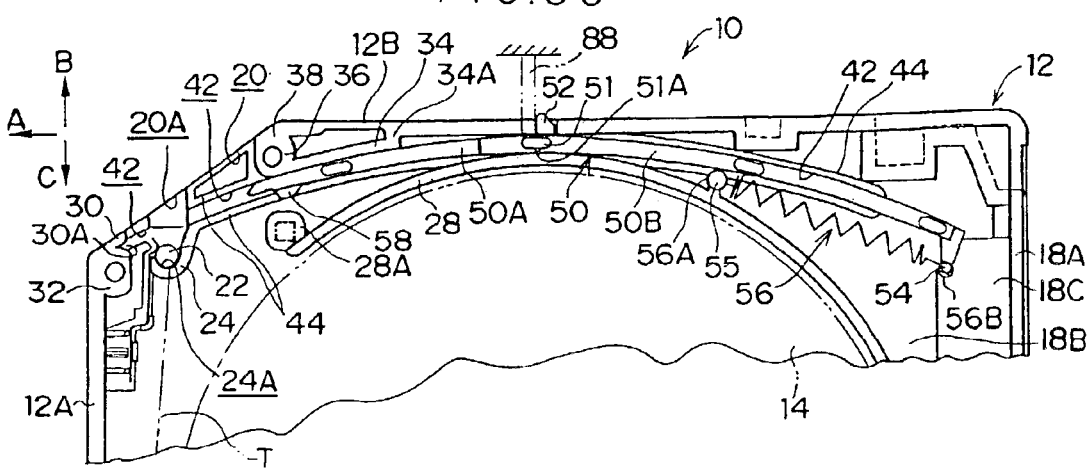
FIG. 5C is a view, as seen with the upper case removed, of the process of opening the opening of the recording tape cartridge relating to the embodiment of the present invention, and is a plan view showing a complete state of the process of opening the opening.

When the recording tape cartridge 10 is loaded onto the drive, the operation projection 52 engages the engaging projection 88 of the drive (FIGS. 5A through 5C). This engagement causes the door 50 moving against the urging force of the coil spring 56 with respect to the case 12 to open the opening 20. When the cartridge 10 is ejected from the drive, the opening 20 is closed by the urging force of the coil spring 56.

Then, the arc-shaped door 50 circle around the outer sides of the reel 14 and the pin stands 24 or leader pin 22 without jutting out at all from the locus of movement along the curved configuration thereof. When the door 50 moves to circle around to open and close the opening 20 provided oblique with respect to the direction A, the door never extends the outer figure of the case 12.

Structure of Write-protect Portion

Figure 6:
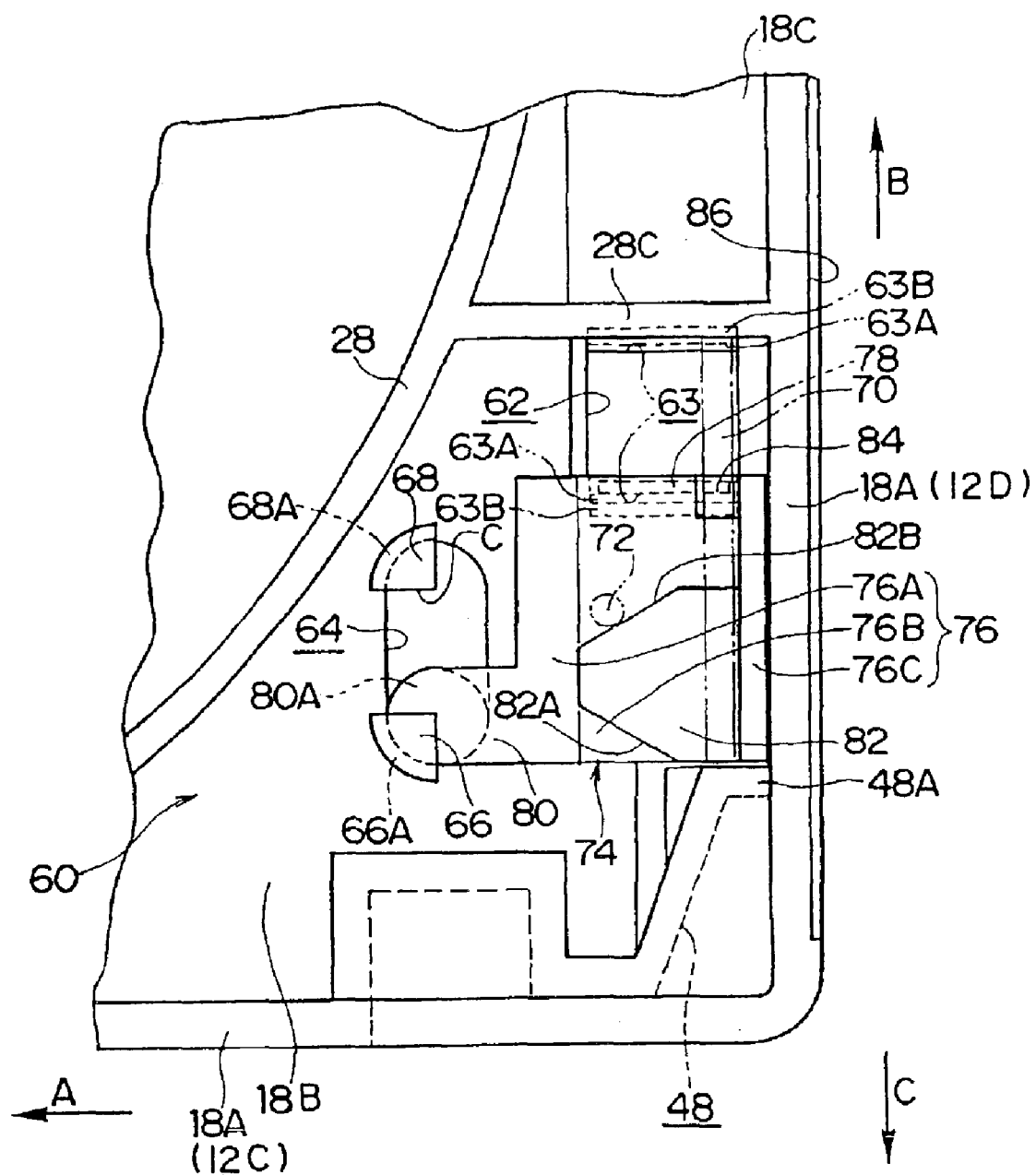
FIG. 6 is a plan view, viewed with the upper case removed, showing a write-protect portion of the recording tape cartridge relating to the embodiment of the present invention.

As shown in FIG. 6, the write-protect portion 60 is provided at a left side of the rear portion of the case 12 (a side of the rear portion which is opposite to the side thereof at which the memory board M is disposed), which is demarcated by the movement restricting walls 28 and the like. Below, descriptions are given with portions of the peripheral walls 16A and 18A, which structure the case 12, at which outer faces thereof face in the direction of arrow C being a left wall 12C and portions at which outer faces thereof face in a rearward direction, which is opposite to the direction of arrow A, being a rear wall 12D (excluding the angled rear wall 18C).

As shown in FIGS. 4 and 6, the write-protect portion 60 is provided with an operation hole 62, which penetrates through the inclined angled rear wall 18C of the lower case 18, and with a recognition opening 64, which penetrates through the floor plate 18B.

The operation hole 62 is formed in a rectangular shape. An operation protrusion 78 of an inadvertent erasure prevention plug (a plug) 74, which is described later, is inserted into the operation hole 62. At an inner side of the case 12, a right edge of this operation hole 62 is located slightly leftward relative to a left end face of the demarcation wall 28C, which is continuous with the movement restricting walls 28 and the angled rear wall 18C (the peripheral wall 18A).

Figure 7:
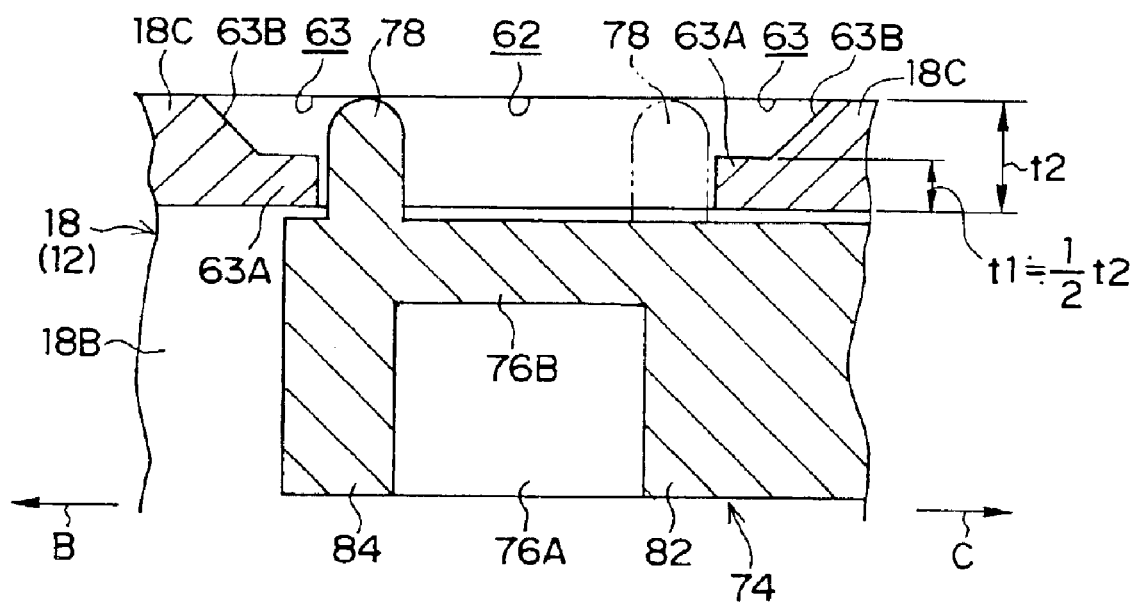
FIG. 7 is a sectional view, cut in a direction intersecting an inclination direction of an angled rear wall, showing an operation hole and operation protrusion of the recording tape cartridge relating to the embodiment of the present invention.

As shown in FIG. 7, recess portions 63, which respectively open at an outer face side of the angled rear wall 18C, are provided continuously at outer sides (in a movement direction of the inadvertent erasure prevention plug 74) relative to left and right edge portions of the operation hole 62. That is, each recess portion 63 is recessedly provided in the angled rear wall 18C (formed by cutting away in a plate thickness direction of the angled rear wall 18C), and communicates with left and right ends, respectively, of a portion of the operation hole 62 that is at the outer face side of the angled rear wall 18C.

Floor portions of the recess portions 63 are made to be straight portions 63A, which are thin-wall portions whose inner and outer faces, which respectively structure the angled rear wall 18C, are mutually parallel. At each straight portion 63A, a thickness t1 thereof is substantially half of a thickness t2 of the angled rear wall 18C (which is approximately 2 mm in the present embodiment), and end faces of the straight portions 63A (edge portions at an inner face side of the angled rear wall 18C), which face one another, define left and right edge portions of the operation hole 62. Further, at each recess portion 63, a respective edge portion thereof at a side which is opposite to the side thereof at which the operation hole 62 is formed, is made to be a taper surface 63B. Thus, opening widths at the outer face side of the angled rear wall 18C are widened.

The recognition opening 64 is disposed to be offset leftward at a front side of the operation hole 62 and is a long hole, both ends of which are rounded in accordance with a recognition portion 80A of the inadvertent erasure prevention plug 74 (which is described later). A left edge of the recognition opening 64 substantially coincides with a right (inside) edge face of a wall portion 48A, which forms a recess portion 48 at a rear-left corner portion of the case 12. The wall portion 48A and the demarcation wall 28C serve as movement limiters (stoppers) of movement of the inadvertent erasure prevention plug 74 in the left-right direction.

Guide pieces 66 and 68, which structure a guide mechanism, are provided at the 18. The guide piece 66 is provided at an upper end of a leg portion 66A. The leg portion 66A has a circular arc shape in (sectional) plan view and is provided standing from the floor plate 18B along a front radius portion of the rounded left edge of the recognition opening 64. The guide piece 66 projects at the front radius portion of the recognition opening 64 (covering the front radius portion) and is formed in a fan shape (a sector of a circle). That is, the guide piece 66 as a whole faces the recognition opening 64 and is a structure of which no portion faces the floor plate 18B.

The guide piece 68 is formed to be symmetrical with the guide piece 66 with respect to an unillustrated longitudinal direction centre line of the recognition opening 64. That is, the guide piece 68 is provided at an upper end of a leg portion 68A. The leg portion 68A is provided standing from the floor plate 18B along a front radius portion of the rounded right edge of the recognition opening 64. The guide piece 68 projects at this front radius portion of the recognition opening 64 (covering the front radius portion) and is formed in a fan shape. Thus, the guide piece 68 as a whole faces the recognition opening 64 and is a structure of which no portion faces the floor plate 18B.

The guide piece 66 and the guide piece 68 are for restricting (blocking) movement of the inadvertent erasure prevention plug 74 in the vertical direction. The guide piece 66 and guide piece 68 are disposed to be separated such that a facing distance therebetween is greater than a width of an arm portion 80 of the inadvertent erasure prevention plug 74. Thus, because the guide piece 66 and guide piece 68 are respectively provided to extend over the recognition opening 64 (entirely opposing the recognition opening 64) from the leg portion 66A and leg portion 68A which are provided standing along the edge portions of the recognition opening 64 as described above, the guide pieces 66 and 68 can be formed integrally with the 18 without formation of an undercut portion.

Figure 8:
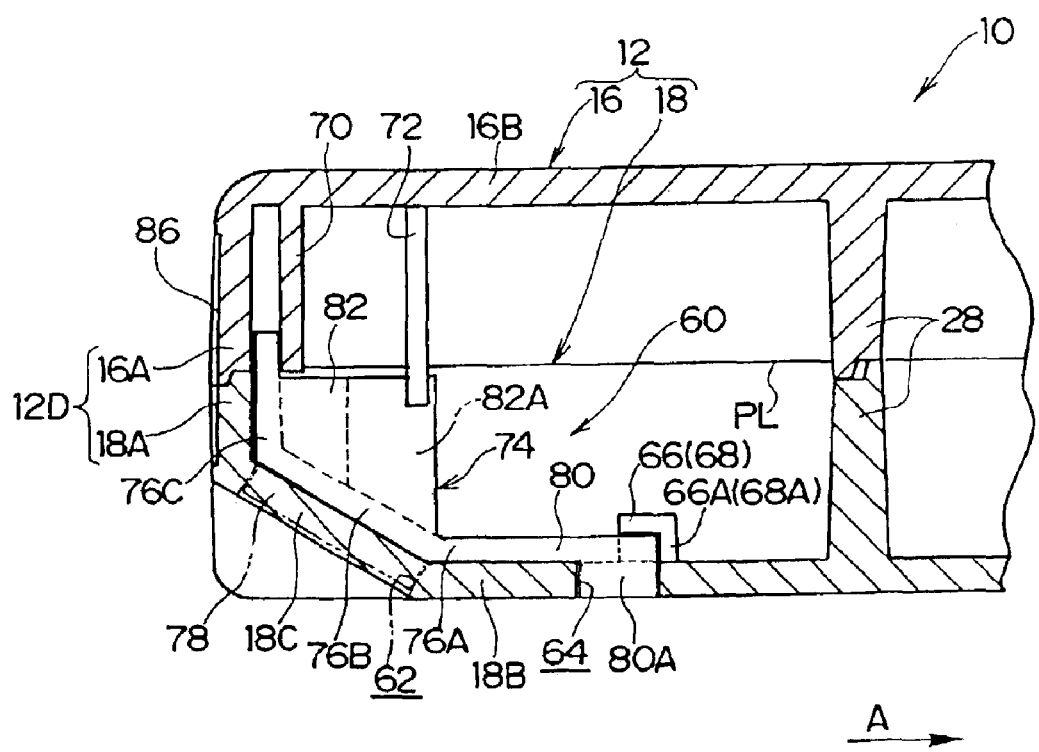
FIG. 8 is a side sectional view showing the write-protect portion of the recording tape cartridge relating to the embodiment of the present invention.

As shown in FIGS. 3 and 8, the write-protect portion 60 is provided with a guide wall 70, which structures the guide mechanism. The guide wall 70 is provided standing from the ceiling plate 16B of the upper case 16 to be substantially parallel with the rear wall 12D. The demarcation wall 28C of the upper case 16 serves as a base end of the guide wall 70 and a position corresponding to the wall portion 48A serves as a terminal end of the guide wall 70. That is, the guide wall 70 is disposed to span the whole of the movement range of the inadvertent erasure prevention plug 74, and serves to restrict (block) movement of the inadvertent erasure prevention plug 74 in the front-rear direction and the vertical direction.

A restraining pin 72 is provided standing from the ceiling plate 16B of the upper case 16. The restraining pin 72 is set such that a length thereof is greater than a height of the peripheral wall 16A, and a distal end of the restraining pin 72, which protrudes to inside the lower case 18, is set to be resiliently deformable in directions of swinging to left and right and to front and rear of the case 12.

Further yet, the write-protect portion 60 is provided with the inadvertent erasure prevention plug (plug) 74, which serves as a switching member. Here, when explanations are given using front, rear, left, right, up and down directions of the inadvertent erasure prevention plug 74, each direction basically refers to a state in which the inadvertent erasure prevention plug 74 is assembled to the case 12.

Figure 9A:
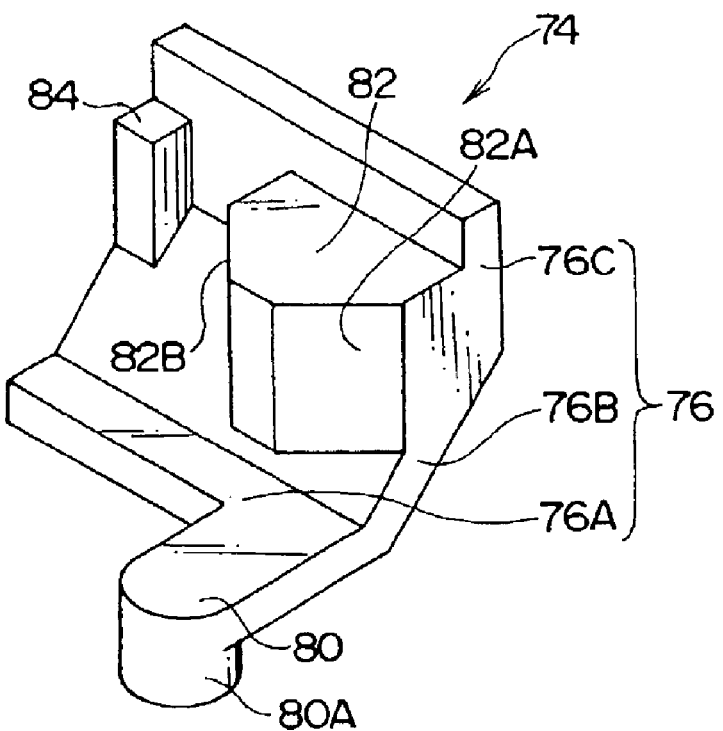
FIG. 9A is a perspective view, viewed from an upper front side, showing an inadvertent erasure prevention plug which structures the write-protect portion of the recording tape cartridge relating to the embodiment of the present invention.
Figure 9B:
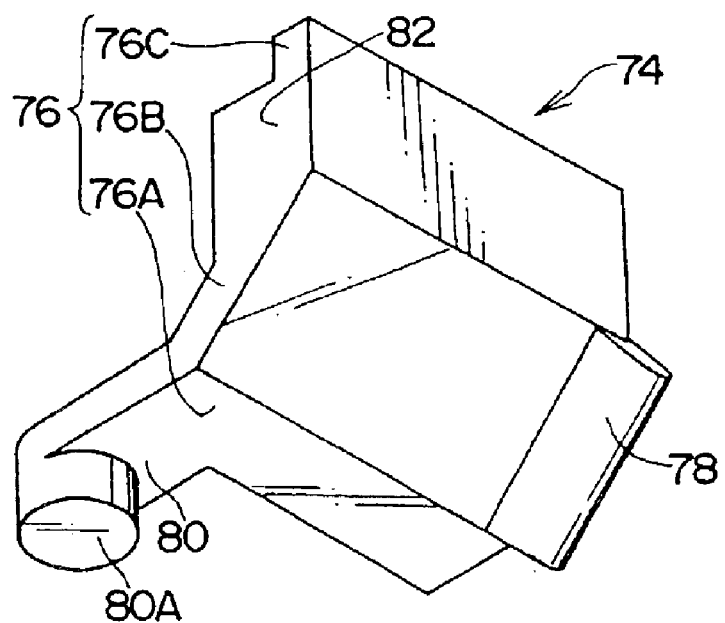
FIG. 9B is a perspective view, viewed from a lower rear side, showing the inadvertent erasure prevention plug which structures the write-protect portion of the recording tape cartridge relating to the embodiment of the present invention.

As shown in FIGS. 9A and 9B, the inadvertent erasure prevention plug 74 is provided with a plate-like main body portion 76, which is inflected in correspondence with an inner face of a rear portion of the case 12. Specifically, the main body portion 76 is structured by a lower face portion 76A, an angled portion 76B and a rear face portion 76C. The lower face portion 76A runs along the peripheral wall 18A. The angled portion 76B is provided extending from a rear end of the lower face portion 76A and is angled (inflected) upward in accordance with the angled rear wall 18C. The rear face portion 76C is inflected upward along the rear wall 12D from an upper rear end of the angled portion 76B.

The operation protrusion 78, a long direction of which runs along the direction of inclination of the angled portion 76B, is protrudingly provided at a rear-right portion of the angled portion 76B of the main body portion 76. In the state in which the inadvertent erasure prevention plug 74 is assembled to the case 12, the operation protrusion 78 is inserted into the operation hole 62 and is exposed to the outside. Thus, the operation protrusion 78 can be operated from outside the case 12 (from an outer face side of the angled rear wall 18C) by being moved in the left-right direction.

The arm portion 80 is provided extending forward from a left end portion of the lower face portion 76A of the main body portion 76. The recognition portion 80A is provided protruding downward from a distal end of the arm portion 80. A width of the arm portion 80 (in the left-right direction) is smaller than the aforementioned facing separation between the guide piece 66 and guide piece 68, and is no more than half of the length of the recognition opening 64. A distal end of the arm portion 80 is rounded substantially in accordance with the two rounded end portions of the recognition opening 64 (and inner faces of the leg portion 66A and leg portion 68A).

The recognition portion 80A is formed in a short circular column form in correspondence with the distal end of the arm portion 80. In the state in which the inadvertent erasure prevention plug 74 is assembled to the case 12, the arm portion 80 is inserted into the recognition opening 64. The recognition portion 80A (and the arm portion 80) is described in detail later. The recognition portion 80A is a structure for switching permission for recording information to the magnetic tape T in accordance with the position of the recognition portion 80A in the recognition opening 64.

A notch portion 82 and a guide portion 84 are provided extending forward from a front face side of a corner portion between the angled portion 76B and rear face portion 76C of the main body portion 76. A left end of the notch portion 82 coincides with a left end of the main body portion 76, and a right end of the notch portion 82 reaches a left-right direction central portion of the main body portion 76. A substantially front half portion of the notch portion 82 is formed in a trapezoid form in plan view, which narrows toward a distal end thereof. At a left side of the notch portion 82 there is a taper surface 82A, and at a right side of the notch portion 82 there is a taper surface 82B. In the state in which the inadvertent erasure prevention plug 74 is assembled to the case 12, the notch portion 82 is disposed such that one or other of the taper surface 82A and taper surface 82B abuts against the restraining pin 72.

The guide portion 84 is located at a right end portion of the main body portion 76. An upper end face of the guide portion 84 is at the same level as an upper end face of the notch portion 82 (heights thereof coincide). Thus, in the state in which the inadvertent erasure prevention plug 74 is assembled to the case 12, the respective upper end faces of the notch portion 82 and the guide portion 84 abut against a lower side face of the guide wall 70 of the case 12.

The inadvertent erasure prevention plug 74 described above is assembled to the case 12 and structures the write-protect portion 60. Specifically, when the inadvertent erasure prevention plug 74 is in a state in which, as shown in FIG. 8, the lower face portion 76A (and the arm portion 80), the angled portion 76B and the rear face portion 76C of the main body portion 76 are slidably contacted with inner faces of the floor plate 18B, the angled rear wall 18C and the rear wall 12D (the peripheral walls 16A and 18A), respectively, of the case 12, the operation protrusion 78 is inserted into the operation hole 62 and the notch portion 82 is inserted into the recognition opening 64.

Figure 10A:
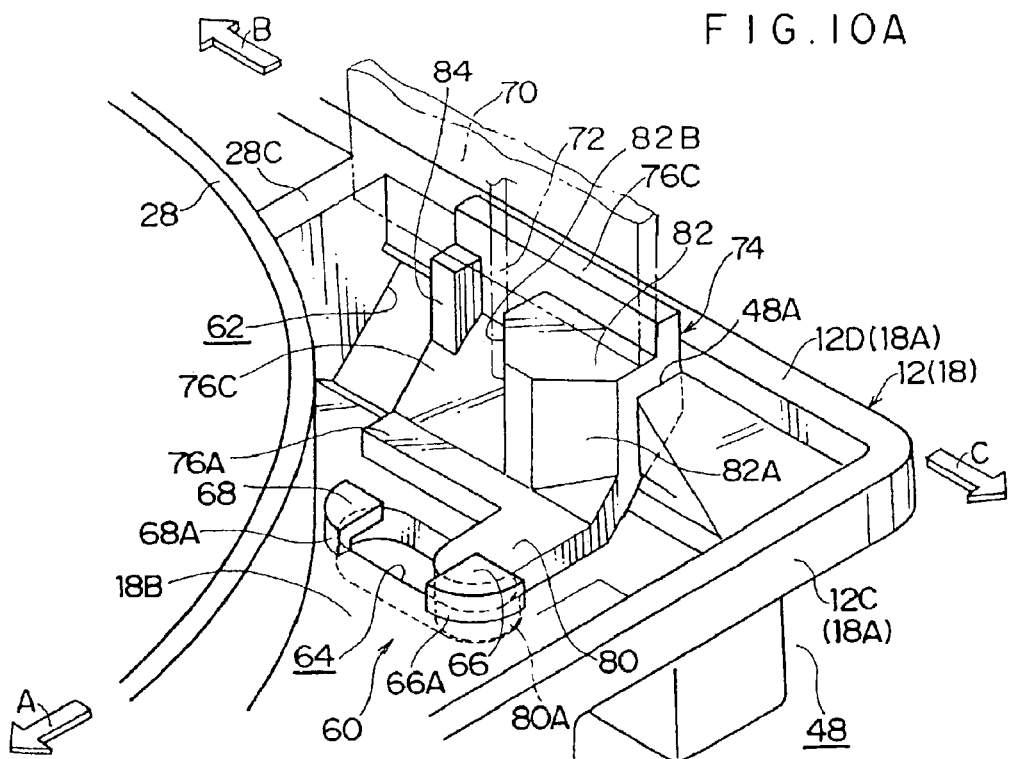
FIG. 10A is a perspective view, in which the write-protect portion of the recording tape cartridge relating to the embodiment of the present invention is viewed from an inner side, showing a state in which recording to a magnetic tape is enabled.
Figure 10B:
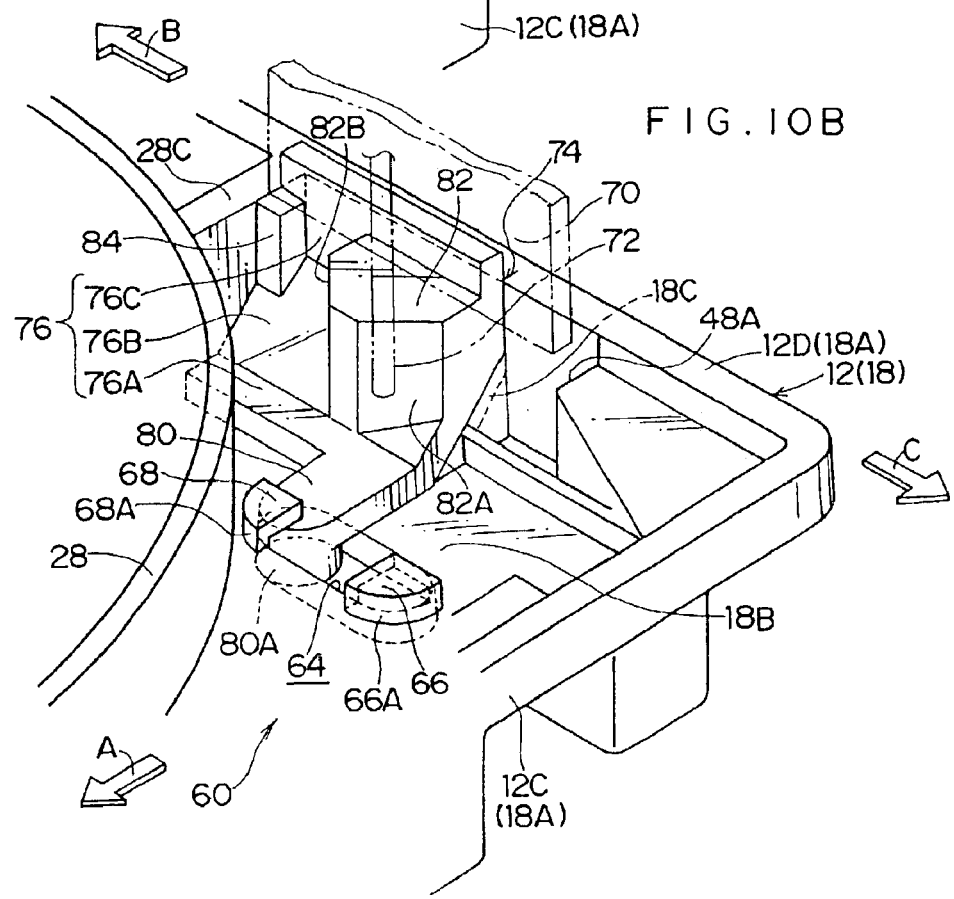
FIG. 10B is a perspective view, in which the write-protect portion of the recording tape cartridge relating to the embodiment of the present invention is viewed from the inner side, showing a state in which recording is disabled.

In this state, as shown in FIGS. 10A and 10B, a lower end face of the guide wall 70 is approximately in slidable contact with the respective upper end faces of the notch portion 82 and the guide portion 84, a rear face of the guide wall 70 is approximately in slidable contact with a front face of the rear face portion 76C, and the restraining pin 72 abuts against one or other of the taper surface 82A and the taper surface 82B. In addition, the recognition portion 80A is disposed at a left or right end portion of the recognition opening 64, and the upper face of the arm portion 80 is approximately in slidable contact with the guide piece 66 or the guide piece 68.

Figure 11A:
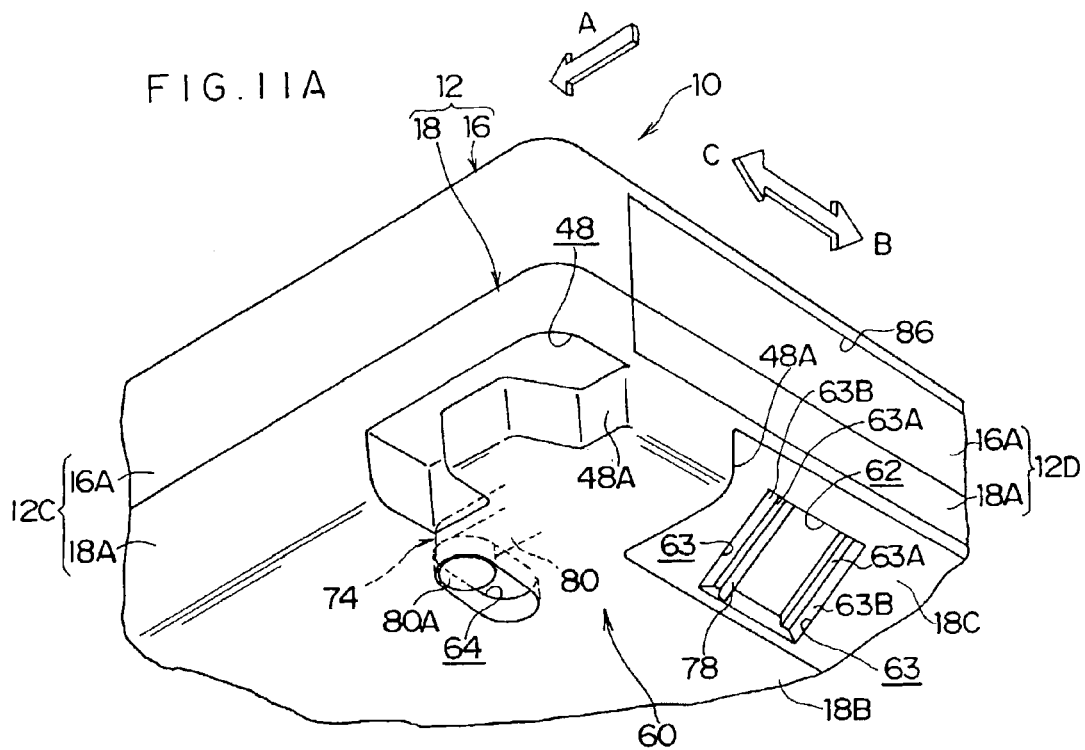
FIG. 11A is a perspective view, in which the write-protect portion of the recording tape cartridge relating to the embodiment of the present invention is viewed from an outer side, showing the state in which recording is enabled.
Figure 11B:
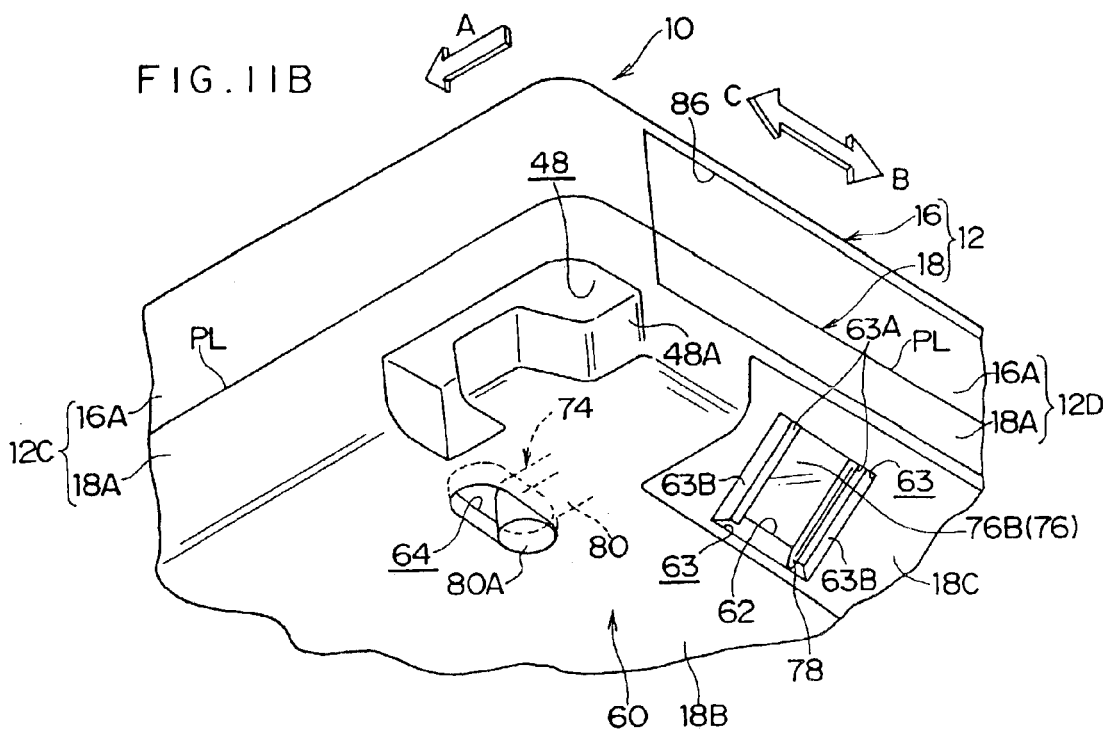
FIG. 11B is a perspective view, in which the write-protect portion of the recording tape cartridge relating to the embodiment of the present invention is viewed from the outer side, showing the state in which recording is disabled.
Figure 12:
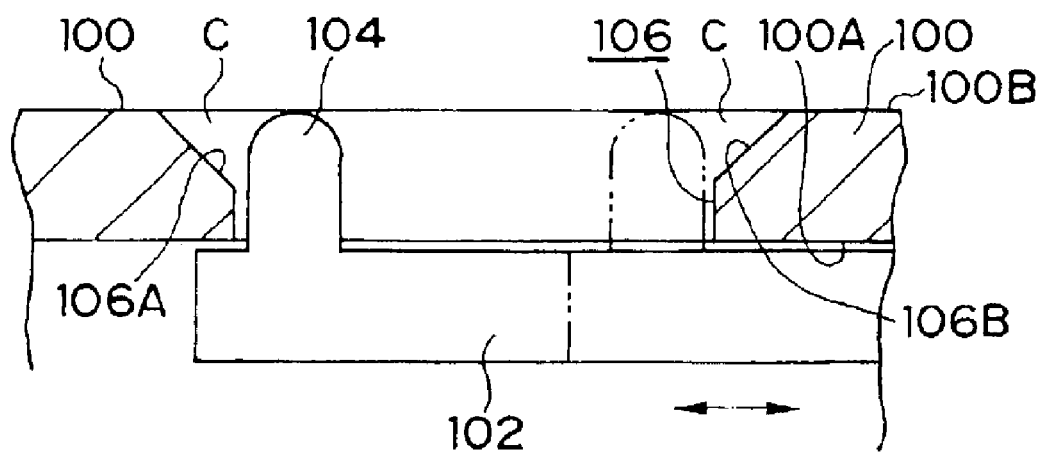
FIG. 12 is a sectional view showing an operation hole and operation protrusion of a write-protect portion of a conventional cartridge.

That is, at the write-protect portion 60, when the restraining pin 72 abuts against the taper surface 82B and the operation protrusion 78 is disposed at the left end portion of the operation hole 62, as shown in FIGS. 10A and 11A, the recognition portion 80A closes off the left end portion of the recognition opening 64, and when the restraining pin 72 abuts against the taper surface 82A and the operation protrusion 78 is disposed at the right end portion of the operation hole 62, as shown in FIGS. 10B and 11B, the recognition portion 80A closes off the right end portion of the recognition opening 64.

In the state in which the recognition portion 80A closes off the right end portion of the recognition opening 64 (shown in FIGS. 10B and 11B), the write-protect portion 60 is set to the recording disabled state in which recording of information to the magnetic tape T is disabled. Specifically, at a drive device, if a recognition pin of a mechanical recognition apparatus (neither of which is shown) abuts against the recognition portion 80A or the recognition portion 80A is detected by an optical recognition apparatus (not shown), the drive device enters a state in which recording to the magnetic tape T is disabled. Thus, the inadvertent erasure prevention plug 74 is a structure which, by the right end portion of the recognition opening 64 being closed off by the recognition portion 80A and this being recognized at a drive device, sets disabling of information recording by the drive device to the magnetic tape T. At this time, the operation hole 62 is closed off by the angled portion 76B of the inadvertent erasure prevention plug 74.

In the state of the write-protect portion 60 in which the recognition portion 80A closes off the left end portion of the recognition opening 64 (shown in FIGS. 10A and 11A), which is to say a state in which the recognition portion 80A opens up the right end portion of the recognition opening 64, because the above-mentioned pin or optical recognition apparatus does not detect the recognition portion 80A, the drive device is set to the recording enabled state in which recording of information by the drive device to the magnetic tape T is allowed. In this state, the operation hole 62 is opened up.

In this manner, the inadvertent erasure prevention plug 74 (recording permission) is alternatively switched between the recording disabled state and recording enabled state of the magnetic tape T by the recognition portion 80A of the arm portion 80 opening and closing the right end portion of the recognition opening 64. Thus, this switch is a structure which implements operation in the left-right direction of the operation protrusion 78, which is inserted into the operation hole 62 and exposed to the outside, from outside, and movement of the inadvertent erasure prevention plug 74 in the left-right direction.

As shown in FIG. 7, a protrusion height of the operation protrusion 78 from the angled portion 76B is determined such that the operation protrusion 78 does not protrude further than the outer face of the angled rear wall 18C of the case 12. As a result, inadvertent switching of the magnetic tape T recording permission, by the operation protrusion 78 being caught on by something, is prevented.

As shown in FIGS. 11A and 11B, the operation protrusion 78 is made to be easily accessible from left and right directions thereof by the recess portions 63 which are formed in the angled rear wall 18C of the case 12 at the left and right edge portions of the operation hole 62 (i.e., the operation protrusion 78 is exposed to left and right), and the operation protrusion 78 can be easily operated by inserting a fingertip or the like at the recess portions 63. Now, in order to provide this function for operating the operation protrusion 78 with ease, the lengths of the straight portions 63A in the left-right direction (the direction of operation of the inadvertent erasure prevention plug 74) is set to be at least 0.1 mm, and preferably at least 0.5 mm (about 1 mm in the present embodiment, in which the thickness t2 of the angled rear wall 18C is about 2 mm).

With this write-protect portion 60, when the inadvertent erasure prevention plug 74 moves in the left-right direction due to operation of the operation protrusion 78, the inadvertent erasure prevention plug 74 deforms the restraining pin 72, which abuts against the taper surface 82A or the taper surface 82B, and pushes past the restraining pin 72. As a result, with this write-protect portion 60, a user who is performing the above-mentioned operation receives notch-type sensory feedback (a sense of restraint), and this structure prevents unintended movement of the inadvertent erasure prevention plug 74 (and switching of the recording permission, described later).

With this write-protect portion 60, upward movement of the inadvertent erasure prevention plug 74 (i.e., movement in a direction to separate from the floor plate 18B) is restricted by the guide piece 66 or guide piece 68, which the arm portion 80 approximately contacts, and the guide wall 70, which upper end faces of the notch portion 82 and the guide portion 84 approximately contact. In addition, forward movement of the inadvertent erasure prevention plug 74 is restricted by the guide wall 70, which the rear face portion 76C approximately contacts, and the recognition opening 64, at which the recognition portion 80A is inserted (and the respective inner face of the leg portion 66A or leg portion 68A opposing the distal end of the arm portion 80). Thus, with this structure, movement due to the aforementioned operation of the operation protrusion 78 is allowed only in the left-right direction (i.e., the inadvertent erasure prevention plug 74 is guided in the left-right direction).

A label area 86 is recessedly formed at an outer face (rear face) of the rear wall 12D of the case 12. The label area 86 is formed in a substantially rectangular shape in rear view, and spans substantially the whole length of the rear wall 12D in a long direction thereof. A parting line PL is located substantially at a central portion of the label area 86. Because the operation hole 62 of the write-protect portion 60 is formed in the angled rear wall 18C and the write-protect portion 60 does not include a portion that is exposed at the rear wall 12D, the label area 86 can be provided with a large area. Further, because the operation hole 62 (and the operation protrusion 78) can be observed from the rear face side of the case 12 (for example, in a state in which the case 12 is stacked in the thickness direction thereof or a state in which the case 12 is accommodated in a holder of a library device or the like), an operator can recognize the magnetic tape T recording permission from the rear face side, by visually observing the opened or closed state of the operation hole 62.

Next, operation of the present embodiment will be described.

At the recording tape cartridge 10 with the structure described above, the operation protrusion 78 of the inadvertent erasure prevention plug 74 structuring the write-protect portion 60 is operated by an operator as required, and the magnetic tape T recording permission is switched.

Hence, in the recording disabled state of the magnetic tape T, in which the recognition portion 80A of the inadvertent erasure prevention plug 74 covers up the right end portion of the recognition opening 64, when the recording tape cartridge 10 is loaded at a drive device, the drive device recognizes the recording disabled state (the recognition portion 80A being disposed at the right end portion of the recognition opening 64) with the aforementioned mechanical or optical recognition apparatus and the drive device enters a state in which recording of information to the magnetic tape T is disabled. As a result, for example, information that has been recorded at the magnetic tape T is preserved, while playback of information that has been recorded to the magnetic tape T is allowed.

In the recording enabled state of the magnetic tape T, in which the recognition portion 80A of the inadvertent erasure prevention plug 74 opens up the right end portion of the recognition opening 64, when the recording tape cartridge 10 is loaded at the drive device, the drive device does not recognize the recording disabled state (the recognition portion 80A being disposed at substantially the right half of the recognition opening 64) with the mechanical or optical recognition apparatus, and the drive device enters a state in which recording to the magnetic tape T is enabled. In this state too, playback of information that has been recorded to the magnetic tape T is allowed.

Inside the drive device, in accordance with loading of the recording tape cartridge 10, an engaging protrusion 88 of the drive device engages with the operation protrusion 52 of the door 50, and consequently the door 50 rotates substantially in the rearward direction and opens up the opening 20. The leader pin 22 is drawn out by a drawing-out mechanism and is accommodated at a winding reel of the drive device. In this state, when instructions for recording of information are provided to the drive device, the winding reel and the reel 14 are driven to rotate contemporaneously and the magnetic tape T is sequentially drawn out from the case 12 while being wound onto the winding reel. Hence, recording of information to the magnetic tape T is implemented by a recording/playback head which is disposed along a predetermined tape path.

When instructions for playback of information are provided to the drive device, regardless of the switching state of the write-protect portion 60 (the magnetic tape T recording permission), the magnetic tape T is sequentially drawn out from the case 12 while being wound onto the winding reel, similarly to the above-described case of recording of information to the magnetic tape T, and playback of information is implemented by the recording/playback head disposed along the predetermined tape path.

After use of the magnetic tape T (after the above-described recording/playback), the recording tape cartridge 10 is ejected from the drive device and, in accordance with the ejection, the door 50 closes off the opening 20 due to the urging force of the coil spring 56.

Here, because the recess portions 63 (the straight portions 63A which are substantially 1 mm long) are provided at the right and left outer side edge portions of the operation hole 62 of the case 12 (the angled rear wall 18C), in other words, because spaces that expose the operation protrusion 78 of the inadvertent erasure prevention plug 74 at the outer sides thereof in the left-right direction are set to be wide by provision of the recess portions 63, a fingertip or the like can be inserted at the recess portions 63 and the operation protrusion 78 can be consistently and easily operated. That is, permission for recording information to the magnetic tape T can be switched with ease.

In addition, because the straight portions 63A whose outer faces and inner faces are substantially parallel are substantially flat, sharp edges are not formed at the edge portions of the operation hole 62 of the case 12. Moreover, because the thicknesses t1 of the straight portions 63A are approximately half the plate thickness t2 of the angled rear wall 18C (i.e., of portions of the lower case 18 surrounding the straight portions 63A), the aforementioned operability and strength of the surroundings of the operation hole 62 when the case 12 is dropped can be improved together.

Accordingly, with the recording tape cartridge 10 relating to the present embodiment, sharp edges are not formed at the edge portions of the operation hole 62, which exposes the operation protrusion 78 of the inadvertent erasure prevention plug 74, and operability of the operation protrusion 78 is improved.

Note that it is sufficient for the present invention that the straight portion 63A (the recess portion 63) be provided at the outer side of at least one edge portion of the operation hole 62 (not limited to the edge portions at the left side and right side in the movement direction of the inadvertent erasure prevention plug 74). The present invention is not limited by other structures and, obviously, various amendments may be embodied.

The embodiment described above is a structure in which the operation hole 62 is formed in the angled rear wall 18C of the case 12. However, the present invention is not limited thus. For example, structures in which the operation hole 62 is provided at the rear wall 12D (including cases in which the case 12 is not provided with the angled rear wall 18C), the bottom plate 18B, the left wall 12C or the like are also possible. Further, the present invention is not limited by forms, structures and the like of the inadvertent erasure prevention plug 74, the recognition opening 64, the guide mechanism and the like. For example, structures are also possible in which the inadvertent erasure prevention plug 74 is not provided with the recognition portion 80A, the recognition opening 64 is a round hole, a square hole or the like which includes only a portion corresponding to the right end portion which is opened and closed, and/or the operation hole 62 is combined with the recognition opening 64 (a position of which, as mentioned above, is not limited).

Further, in the present embodiment, the recording tape cartridge 10, which accommodates a single reel on which magnetic tape is wound in the case 12, is exemplified as an embodiment of the cartridge of the present invention. However, the present invention is not limited thus. For example, the cartridge of the present invention may be applied to a "two reel" type recording tape cartridge which accommodates two reels, for winding out and winding up a magnetic tape T, in the case 12, a disc cartridge which rotatably accommodates a disc-like medium, such as an optical disc, or a magnetic disc, in the case 12. Obviously, structure of a recording tape cartridge to which the present invention is applied is not limited to the recording tape cartridge 10 described above.

A cartridge relating to the present invention as described above has excellent effects in that a guide mechanism for guiding a switching member can be reduced in size and assembly characteristics of the switching member are favorable.

What is claimed is:

1. A cartridge comprising:
    a case which accommodates a recording medium thereinside;
    a switching member movably disposed in the case, the switching member alternatively switching, by movement thereof, between a recording disabled state, which disables recording of information to the recording medium, and a recording enabled state, which cancels the recording disabled state;
    an operation portion protrudingly provided at the switching member, the operation portion being operated at a time when the switching member is to be moved;
    a portion at which a hole is formed, the operation portion being provided to penetrate through the case and the operation portion being inserted into the hole and exposed outside the case; and
    a thin-wall portion at which, at an edge portion of the portion at which the hole is formed, an outer face side of the case is recessed to be substantially parallel with an inner face side of the case.

2. The cartridge of claim 1, wherein the switching member comprises a plug including a plate-form main body portion which is inflected in correspondence with the inner face of the case, the main body portion including:
    a lower face portion along a floor plate of the case;
    an angled portion extendingly provided to be inclined from one end of the lower face portion; and
    a rear face portion inflected to extend from one end of the angled portion.

3. The cartridge of claim 2, wherein the operation portion comprises an operation protrusion which is provided such that a long direction thereof extends along an inclination from the other end of the angled portion.

4. The cartridge of claim 3, wherein the operation protrusion comprises a protrusion height from the angled portion which protrusion height is determined such that the operation protrusion does not protrude beyond an outer face of the angled rear wall of the case.

5. The cartridge of claim 4, wherein the operation protrusion is accessible from left and right directions via the recess portion.

6. The cartridge of claim 3, wherein the plug is capable of deforming and pushing past the restraining pin consequent to movement of the plug in one direction due to operation of the operation protrusion.

7. The cartridge of claim 2, wherein the case comprises an upper case and a lower case, and the cartridge includes a guide wall for restricting movement of the plug in a front-rear direction and a vertical direction, the guide wall standing from the ceiling plate of the upper case to be parallel with a rear wall, and the guide wall spanning the whole of a movement range of the plug.

8. The cartridge of claim 1, wherein the case comprises a floor plate, and a recognition opening is formed in the floor plate.

9. The cartridge of claim 8, further comprising an arm portion extending from the other end of the lower face portion and a recognition portion at a distal end of the arm portion, the recognition portion being insertable at the recognition opening.

10. The cartridge of claim 9, further comprising, along a portion of the recognition opening:
    a first leg portion which includes a circular arc form in plan view and is provided standing at the floor plate of the case;
    a first guide piece disposed at an upper end of the first leg portion, the first guide piece including a fan shape which projects at a front half of the recognition opening;
    a second leg portion which is provided standing at the floor plate of the case symmetrically to the first leg portion with respect to the recognition opening; and
    a second guide piece disposed at an upper end of the second leg portion, the second guide piece including a fan shape which projects at the front half of the recognition opening,
    the first and second guide pieces being for limiting movement of the plug in a vertical direction.

11. The cartridge of claim 10, wherein the first and second guide pieces are disposed to be separated such that a facing distance therebetween is greater than a width of the arm portion of the plug.

12. The cartridge of claim 1, wherein
    the case comprises an inclined angled rear wall,
    the thin-wall portion includes a recess portion, at which the portion at which the hole is formed opens at an outer face side of the angled rear wall, and straight portions structuring the angled rear wall, the straight portions including a floor portion of the recess portion,
    the recess portion communicates with left and right ends of the hole at a portion of the hole which is at the outer face side of the angled rear wall, and
    end faces of the straight portions define left and right edge portions of the hole.

13. The cartridge of claim 12, wherein the straight portion comprises a thickness of approximately half a thickness of the angled rear wall.

14. The cartridge of claim 13, wherein the angled rear wall of the case includes a thickness with a value in a range from 1 mm to 2 mm.

15. The cartridge of claim 1, wherein the case comprises an upper case, a lower case and a restraining pin which is provided standing from a ceiling plate of the upper case, the restraining pin being longer than a height of a peripheral wall of the upper case and a distal end of the restraining pin, which protrudes to inside the lower case, being resiliently deformable in directions of swinging toward left, right, front and rear of the case.

16. The cartridge of claim 1, wherein the cartridge is a recording tape cartridge which rotatably accommodates at least one reel, on which recording tape is wound, in the case.

17. The cartridge of claim 1, wherein the cartridge is a disc cartridge which rotatably accommodates a disc-form medium in the case.

18. The cartridge of claim 1, wherein the portion at which the hole is formed and the operation portion are visible from a rear face side of the case.

* * * * *